United States Patent [19]

Diefenthaler

[11] Patent Number: 4,537,531
[45] Date of Patent: Aug. 27, 1985

[54] TILE LAYER

[76] Inventor: David L. Diefenthaler, 80 West La., Apt. 2-H, Columbus, Ohio 43201

[21] Appl. No.: 387,814

[22] Filed: Jun. 14, 1982

[51] Int. Cl.$^3$ .............................................. F16L 1/02
[52] U.S. Cl. ..................................... 405/174; 405/156
[58] Field of Search ............... 405/156, 174, 177, 180, 405/183, 43

[56] References Cited

U.S. PATENT DOCUMENTS

| | | |
|---|---|---|
| 2,812,731 | 11/1957 | Gardner ............................. 405/183 |
| 3,111,007 | 11/1963 | Ryan ................................. 405/177 X |
| 3,193,432 | 7/1965 | Baines . |
| 3,217,500 | 11/1965 | Diamond et al. ................... 405/156 |
| 3,300,988 | 1/1967 | Reising . |
| 3,528,255 | 9/1970 | Blinne . |
| 3,605,419 | 9/1971 | Wells . |
| 3,641,780 | 2/1972 | Ede . |
| 3,831,388 | 8/1974 | Wells . |
| 3,849,999 | 11/1974 | Coffey . |
| 3,859,809 | 1/1975 | Clayhold et al. . |
| 3,948,059 | 4/1976 | Pompa ................................ 405/176 |
| 3,998,065 | 12/1976 | Darnell . |
| 4,028,902 | 6/1977 | Courson et al. . |
| 4,142,817 | 3/1979 | Lazure . |
| 4,159,190 | 6/1979 | Duggins et al. . |
| 4,397,585 | 8/1983 | Fouss et al. ......................... 405/183 |

Primary Examiner—David H. Corbin
Attorney, Agent, or Firm—Wood, Herron & Evans

[57] ABSTRACT

A tile layer can be opened to expose its interior for tile loading and unloading. The layer is functional to handle both arched and round tile, and is used in conjunction with a trenching apparatus.

4 Claims, 9 Drawing Figures

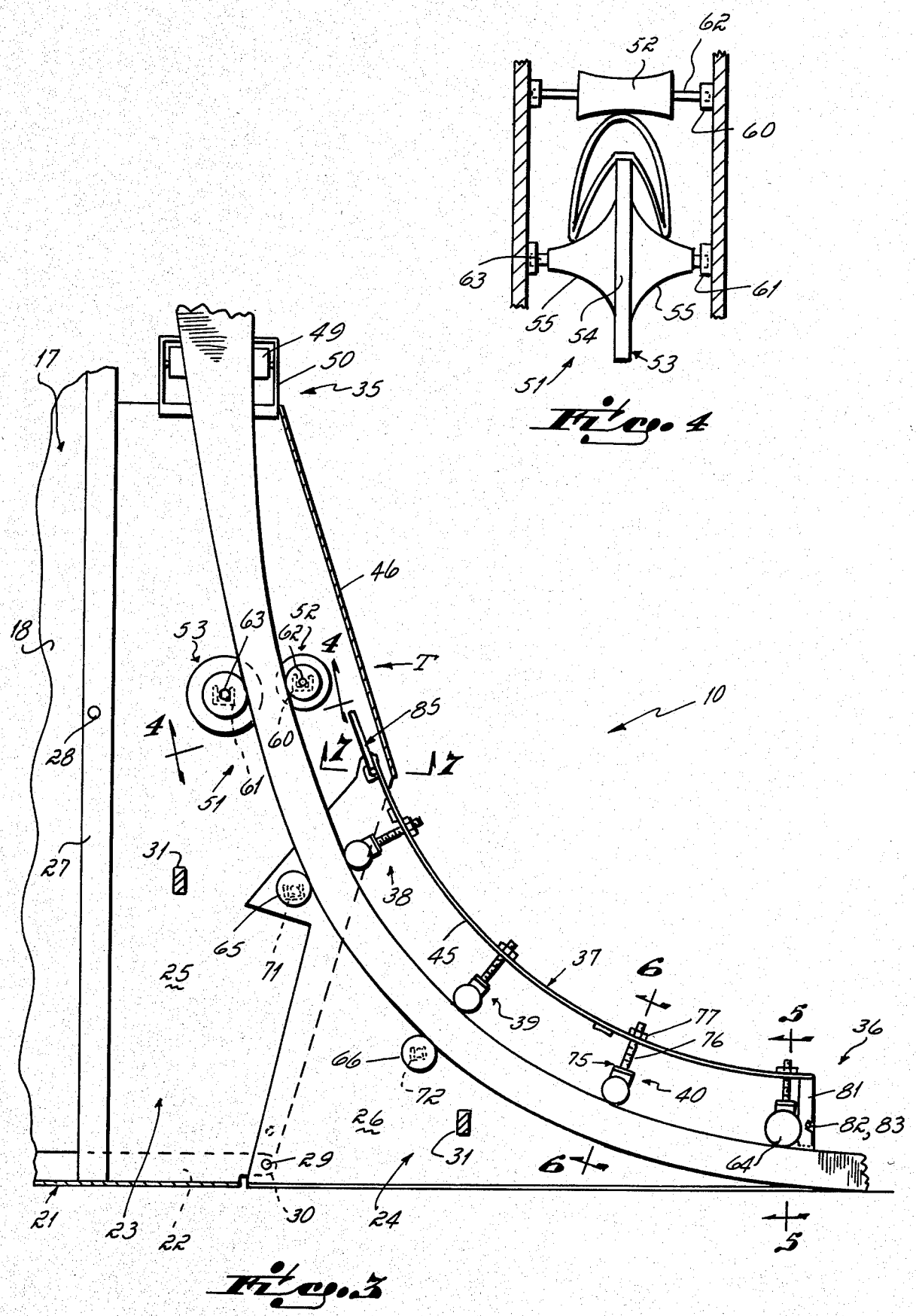

TILE LAYER

BACKGROUND OF THE INVENTION

This invention relates to plastic pipe or tile laying apparatus, and more particularly to a continuous corrugated tile laying apparatus which is atttched to a trench digging machine.

Perforated corrugated drainage pipe, or tile, as it is commonly referred to, is frequently utilized in areas where normal water drainage is insufficient for the land use desired. Improved drainage is conventionally obtained by laying tile in a sub-surface position by means of a trench digging machine and an associated tile layer. The trenching machine digs the trench while the following tile layer places the tile at the trench bottom. Thereafter, the trench is backfilled, thus holding the laid tile as the layer moves on down the trench. The secured or laid tile pulls tile from the layer as the layer progresses.

Conventional tile layers have been in use for some time, however, such layers are attended by a number of problems and disadvantages which makes their was difficult. For example, the known layers in use tend to exert a great deal of frictional force on the tile as it passes through the layer. It accordingly may require a pulling force on the order of 100 pounds to pull the tile through the layer. Excessive pulling forces exerted on the tile as the layer moves down the trench can stretch or cause deformation of the tile.

Moreover, these frictional forces in known layers must be dealt with when loading and unloading the layer. This makes both loading and unloading the layer a difficult task. Great forces must be used to pull the tile through the layer to load or unload it.

Also, in the laying operation, it is common for the trencher to engage obstructions, such as rocks. When the trencher encounters such an obstruction, the trencher and associated layer must be lifted out of the trench so that the obstruction can be removed. This places substantial bending pressures on the tile and can cause it to deform or split.

Specifically, as the layer is lifted away from the trench bottom, the placed tile pulls tile through the layer, against the frictional forces mentioned, and can cause undesirable stretching or failure of the tile. Ordinarily, the current practice is thus to cut the tile, in order to lift the trencher. This necessitates splicing the tile ends back together when laying is resumed.

Still further, the known current layers are primarily adapted for laying of only one kind of tile, such as the round corrugated variety. Such layers are consequently limited in their usefulness where tile cost and availability, or terrain dictate a different size or type of tile.

Tile primarily comes in one type, i.e., corrugated, perforated, circular cross section, plastic conduit of several different sizes. The circumferential corrugations provide flexibility such that the tile can be wound on large rolls, from which it is fed into the tile layer, while producing substantial resistance to crushing when the tile us buried.

Another form of tile is the type known as "arched" tile. Such a tile is semi-circular, or arched, in upper cross section, and has a flat, flexible floor extending as a diametral chord between the ends of the semi-circular or arched portion.

The arched portion is longitudinally hinged at the arch apex so the side portions of the arch can be folded inwardly together, with the flexible floor preferably folding inwardly toward the apex. Both the arched portion and the floor can be perforated, or only the floor is perforated, as desired, for the ingress of water into the tile from the floor of the trench in which the tile is laid.

Arched tile has the advantage of being collapsible, and can be folded upon itself by forcing the flat bottom upwardly into the apex of the curved portion. More arced tile can consequently be wound on a given roll.

Nevertheless, the laying of such arched tile presents additional necessary functions for the tile layer since the tile not only must be laid in the trench, but it must be erected or unfolded as well as it moves through the layer. Layers for round tile are thus not useful for laying arched tile since there are no provisions for erecting the arch tile, or for maintaining it in position without flipping or turning in the layer.

Accordingly, it is one objective of this invention to provide an improved tile layer.

Another objective of the invention is to provide a tile layer having simple access to its interior such that the tile can be placed into and removed from the layer with little or no load or pull force thereby imposed upon the tile.

Another objective of the invention is to provide a tile layer from which tile can be removed during the tile laying operation in order to permit removal of the trencher and related layer mechanism without disturbing the laid tile, and with little or no bending force applied to the tile.

Yet another objective is to provide a tile layer capable of handling various types of tile, including both corrugated round and arched tile, as well as round tile of varying diameters.

SUMMARY OF THE INVENTION

To these ends, a preferred tile layer according to the invention can be opened to provide access to the interior of the layer. Tile can be loaded and unloaded simply by laying the tile in the layer, or removing it, through the opening, all without exerting any significant pulling force on the tile. Also, when an obstruction is encountered, the layer can be opened, the tile removed, and the layer moved to avoid the obstruction, all without unduly stressing the tile or cutting it. Once the obstruction is removed, the tile is simply laid back into the layer and laying resumes.

More specifically, the instant invention comprises an improved tile laying apparatus having a forward section and a rearward section pivoted thereto. Each section has a pair of spaced substantially vertically oriented side shields. The rearward section is pivoted to the forward section to permit the rearward section to "float" during operation of the layer. This is particularly advantageous when beginning the trench digging operation to permit flexing of the layer as the trencher makes it typical rapid entry into the ground to reach the desired grade for tile laying.

The side shields of the rearward section have edges defining a top opening preferably covered by a removable panel on which are mounted tile supporting guide rollers. These rollers are interchangeable with other rollers for handling tile of different forms and sizes, and the rollers, in use, define a curving flow path for the tile as it is fed and passes through the layer.

The side shields of the forward section also have edges defining a top opening therebetween. A second panel is secured across this opening and is preferably pivoted to one of the shields so that it can be opened to provide further access to the interior of the layer.

An initial tile engaging roller is removably disposed between the side shields of the forward layer section. This roller serves to initially engage and guide the tile of either round or arched configuration within the layer.

In combination, the preferred side shields of the forward and rearward sections thus have upper edges refining the aforementioned openings and also substantially defining a 90° arc through which the tile is drawn as it is fed through the layer. As will be appreciated, the forward edges of the forward section side shield are vertically disposed and form a right angle with the lower edges of all side shields.

The rearward or top openings in the preferred layer sections as described are unobstructed, with the exception of the panels, the rollers mounted on the panels, and the initial tile engaging roller. Accordingly, when the panels and the initial roller are removed, complete and unobstructed access is obtained to the layer interior, and importantly, to the tile path itself. The layer then can be opened and loaded with tile, or unloaded, even when it is within a trench, without requiring any pulling force on the tile.

The layer can be unloaded and removed from the trench completely independently of the tile in order to avoid obstructions and permit their removal without stretching the tile.

The preferred layer also provides means by which arched conduit can be fed, erected, and laid. In particular, when arched conduit is used, a convex spreader roller is disposed opposite the initial energizing roller. The spreader roller has inclined surfaces tapering away from a central disc which is inserted beneath the arched tile. The sides of this tile are partially erected as the ends of the arched tile ride over the roller and slide outwardly. The roller also guides the tile and maintains it against twisting in the tile flow path.

Finally, it should be noted that the rearward layer section is pivoted to the forward section when round tile is to be laid in order to clear the circular path cut in the earth by the trencher and any associated bottom forming plow. When the layer is used to lay arched tile, a flat trencher plow is used to form a flat bottomed trench for the flow of the arched tile. The rearward section of the layer in this configuration is preferably pivoted to the rear end of the bottom forming plow, or shoe, of the trencher to lower the rearward section and lay the erected tile directly on the flat trench bottom.

Accordingly, the preferred tile layer can be completely opened for the unstressed loading and unloading of tile, and the layer is capable of handling both round and arched types of tile, as well as varying sizes of tile, merely by simple adjustments and roller changes.

These and other objectives and advantages will be further appreciated by reference to the following detailed description of a preferred embodiment of the invention and accompanying drawings in which:

BRIEF DESCRIPTION OF THE DRAWINGS

FIG. 3 is a cross sectional view of the tile layer of FIG. 1, with the tile layer adapted for use with arch-flow tile;

FIG. 4 is a sectional view taken along line 4—4 of FIG. 3, detailing the arch-flow tile opening roller assembly;

DETAILED DESCRIPTION OF THE INVENTION

Figure 1:
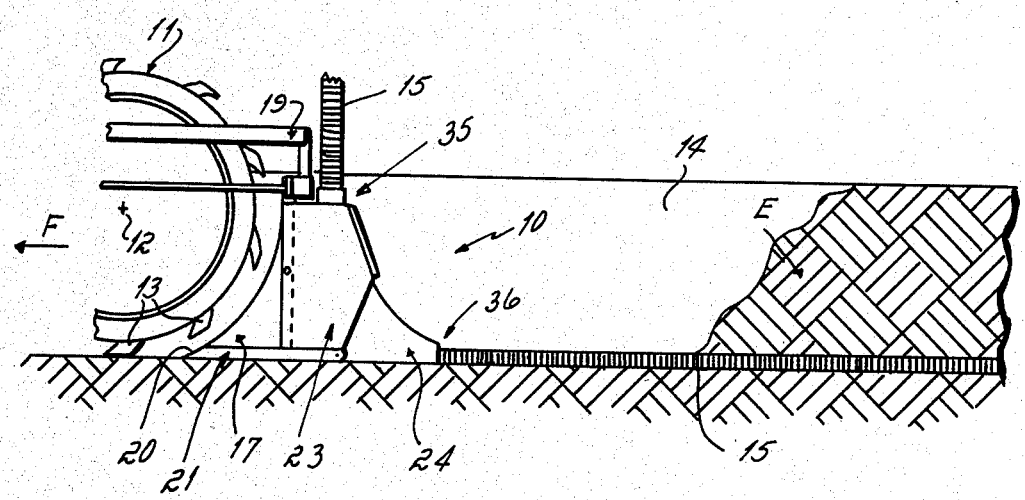
FIG. 1 is side elevational view showing the tile layer of the present invention associated with a trench digging mechanism.

Referring to FIG. 1, the tile layer of this invention is generally indicated by the numeral 10. The layer is shown as it would be typically associated with a trencher; the trenching wheel 11 mounted on an axle 12 is driven by a suitable source of motive power. The wheel 11 has a plurality of diggers, or buckets, 13 which cut into the earth as the wheel 11 rotates to thereby form a trench 14 of a desired depth into which the tile 15 is laid. Earth removed in forming the trench 14 may be deposited at one side of the trench or in an appropriate loading means for later redeposit into the trench to thereby bury the laid tile, or may simply be immediately redeposited in the trench so that digging and refiling forms one continuous process effected by the trencher wheel 11.

The trencher employed is of typical structure, including a grooving member 17 which is carried on a support assembly, generally indicated at 19, which is rigidly fixed to the trencher. The grooving member 17 has fixed rigid side panels 18 on either side, and is further provided with a grooving tongue 20 which depends from the grooving member 17. The tongue 20 follows the trencher, projecting in the direction that the trench is being formed, and serves to initially contour the floor of the trench for the tile being laid. Removably fixed to the grooving member 17 and extending rearwardly from the tongue 20 is a shoe 21. The shoe 21 is a rigid rectangular piece of metal which has upturned sides 22, giving the shoe a small vertical depth. The shoe serves in part as a base for the tile layer 10, as well as a mounting surface the various channel groovers which finally contour the trench floor for the specific type and diameter of tile that is being laid. That is, channel groovers are removably fixed in position in a known manner to the bottom of the shoe 21 so as to plow or groove the bottom of the trench 14 into the desired shape for receiving tile. For instance, where arched tile is being laid, arched tile being characterized by a flat bottom and an arcuate upper portion, an appropriate flat bottomed channel iron will be removably fixed to the bottom of the shoe 21 to flatten the bottom of the trench to receive the arched tile. When round tile is being laid, round tile being characterized by a circular cross section, a "circular" channel iron will be mounted to the bottom of the shoe 21 to form a semi-annular longitudinally extending recess in the trench floor of an appropriate depth into which the round tile is laid. It will be noted that the round tile requires the semi-annular groove or socket into which it is laid to give the tile essential side support; this is not a requirement with arched tile, which can merely by placed on the planed floor of the trench.

The tile laying mechanism, or tile layer 10, is formed in two sections comprising a first or forward section 23, and a second or rearward section 24. Both sections are largely constituted by pairs of exterior spaced side shields 25 and 26, respectively, which follow the walls of the trench as it is formed during the trenching operation, supporting and packing the same. The side shields 25 and 26 are rigid metal sheets which, when combined, form a layer 10 of roughly right-triangular configuration. Internal support for maintaining the shields in spaced relation is provided by appropriate rigid cross beams 31 extending between the shields.

Forward side shields 25 are rigidly fastened to a vertically extending shoe post 27 which forms a part of the trencher support assembly 19. A single bolt 28 passing through both side shields 25 and the shoe post 27 and retained by a suitable nut (not shown) has been found satisfactory for mounting the shields 25 in place on the trencher.

In the disclosure of FIGS. 1 and 3, the rearward side panels 26 are each respectively pivotally fixed to rearwardly projecting portions or flanges 30 of shoe sides 22 by means of coupling bolts 29; the interconnection between the forward and rearward sections 23 and 24, here accomplished via the couple with shoe sides 22, is so arranged that the rearward section 24 extends slightly within the forward section 23. This connection for the rearward section 24 permits the rearward section to "float" in the trench by thus providing limited pivotal movement in a vertical plane.

This "flexion" for the layer 10 provided by the pivotable rearward section 24 is particularly advantageous where a rapid entry into the earth is made with the trenching wheel 11, as when beginning a new line. Such rapid entry of the wheel 11 into the ground typically places a substantial initial buckling pressure on the side shields of conventional single section tile layers. Providing the layer 10 with the floating rearward section 24 permits the layer 10 to "flex" as the wheel 11 is rapidly forced into the ground, substantially eliminating all buckling pressures which would otherwise be imposed on the layer.

As shown in FIG. 1, as the trencher moves forwardly, indicated by the arrow F, tile 15 fed from any suitable source, such as a roll of tile (not shown), enters the tile layer 10 through an entry end or area 35 in a substantially vertical orientation, and is reoriented therein, in a manner to be described hereafter, to be discharged through a discharge end or area 36 in a substantially horizontal orientation on the trench bottom. Earth, indicated at E, redeposited in the trench covers the tile 15 and fills the trench 14 so ground level. It will be noted that once tile laying commences, the earth-covered tile serves to draw or pull the tile being laid through the layer 10, no other mechanical force consequently being required in the tile laying operation.

Tile Layer—Arched Tile

Figure 2:
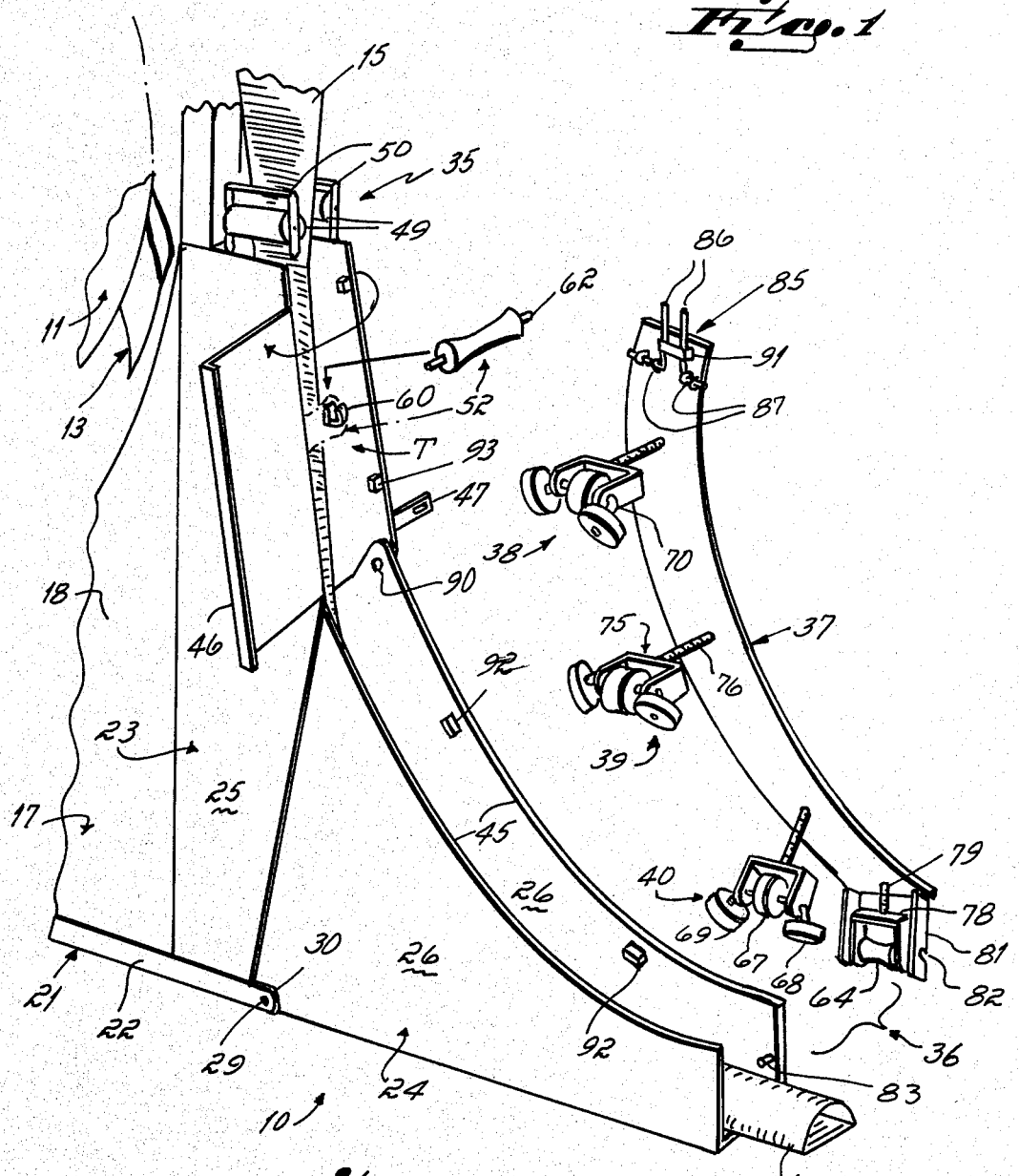
FIG. 2 is a perspective view of a preferred embodiment of the tile layer of this invention, with the top panel removed for detail.

The structure of the tile layer 10, as adapted for laying arched tile is more particularly shown in FIGS. 2–6. In FIG. 2, a removable top or rearward panel 37, which is releasably mounted between the rearward side shields 26, as will be more fully described below, is provided for the layer 10 to permit simple and rapid access to the interior of the layer 10. Since the top panel 37 further serves as a mounting means for various rollers, such as intermediate roller assemblies 38, 39 and 40, which rollers define in part the path of travel of the tile 15 as it passes through the tile layer 10, it has been found advantageous to form the top panel 37 in an arcuate shape, roughly corresponding to the desired path of the tile which it overlies; the upper edges 45 of the rearward side sections 26 are accordingly contoured, although this is a matter of preference rather than limitation since the top panel 37 is designed to seat between the side shields 26 in this preferred embodiment.

To substantially completely enclose the interior of the tile layer 10, a door panel 46 pivotable on hinges (not shown) is provided on the upper portion of the forward section 23. The door is held closed by any suitable means, such as by a clasp 47. It will be noted that enclosure of the interior of the tile layer 10 is desirable to protect the interior mechanism from becoming fouled or jammed by earth or debris churned up by the trenching wheel 11 during the tile laying operation. Although a door panel 46 has been advantageously employed in this embodiment of the invention to enclose and cover the upper portion of the rearward section 23, it will be recognized that the top panel 37 can be extended to cover the same area, such as where the tile layer is formed with a single pair of side shields, there consequently being no consideration for pivoting of a rearward section such as here. Likewise, the door panel 46 could be eliminated in toto if enclosure of this upper portion is deemed unnecessary by the particular application.

The tile layer of the instant invention provides for simple access to the interior of the layer through the employment of the removable top panel 37, which in this preferred embodiment operates in cooperation with the hinged door panel 46 and certain readily removable rollers, such as first concave guide roller 52. Mounting and manipulation of the top panel means will be described in more detail below.

With reference to FIGS. 3–6, the various guide rollers which define the flow path of the arched type tile 15 are shown in particular detail. Cylindrical or flat rollers 49 are rotatably mounted in vertically extending frames 50 along the topmost portion of each forward side shield 25, which side shields together to define the entry 35 to the layer 10. The opposed rollers 49 serve to promote movement of the tile 15 into the entry 35, typically from a roll of tile (not shown) which follows the layer adjacent the top of the trench 15.

A first spreader roller assembly 51 is comprised of first cylindrical concave roller 52 and spreading roller 53. Spreading roller 53 is characterized by a disc-shaped central portion 54 to which is fixed on either side generally frusto-conical shaped sections 55. The side sections 55 have a slightly curved work surface which tapers radially inwardly from adjacent the central portion 54 to the end of the roller 53, as shown in FIG. 4.

Concave and spreading rollers 52 and 53 forming the spreader assembly 51 are removably rotatably mounted in opposed spaced relation between forward side shields 25 through the use of suitable mounting means. Here, generally upwardly facing U-shaped guide and retaining members 60, 61 are provided on the inside of both rearward side shields 24, which members receive the ends of the rods 62 and 63 upon which the rollers 52 and 53, respectively, rotate. Access to these rollers 52 and 53 through the openable top portion of the layer 10, in addition to their ready removability, provides for the ability to adapt the layer 10 for varying types and dimensions of tile, as will be more fully described hereinafter.

The cooperation of the concave roller 52 and spreader roller 53 is shown in FIG. 4. Arch-type tile 15 is typically provided in a collapsed form, whereby the flat bottom of the tile has been pressed into the hinged apex of the curved upper portion of the tile. Consequently, the tile must be erected or opened before it is laid in the trench. Typically, a single concave roller, such as a roller 52, is employed to force the apex of the tile toward the spreader roller. This roller spreads the bottom section of the tile, partially opening it.

As will be appreciated, the spreader roller 53 controls lateral orientation of the tile during this opening operation, and keeps the tile from twisting.

A preferred location for mounting the spreader assembly 51 is at the upper tangency point T of the curved flow path of the tile 15. In other words, the spreader assembly 51 is located at the point where the tile first begins to bend to follow the flow path. Mounting of the spreader assembly at this point permits a substantially vertical flow of tile into entry 35 with reorientation to a substantially horizontal position, with the tile remaining in a relatively relaxed condition and subject to a minimum of bending force throughout the flow path.

With the arched tile partially open at the spreader assembly 51, it continues through the layer 10 in a substantially semi-circular flow path defined by rollers mounted within the rearward section 24 and rollers carried by the top panel 37. The tile is finally erected just beyond the assembly 51 by means of being forced through the curved path by intermediate guide roller means as will be appreciated.

The guide roller means in this preferred embodiment of the invention comprise intermediate roller assemblies 38, 39 and 40 which are mounted in spaced relation along the interior of the top panel 37, a second concave roller 64 carried on the interior of the top panel 37 and mounted adjacent the discharge end 36 of the layer 10, and first and second flat rollers 65 and 66.

Figures 5, 6, 7:
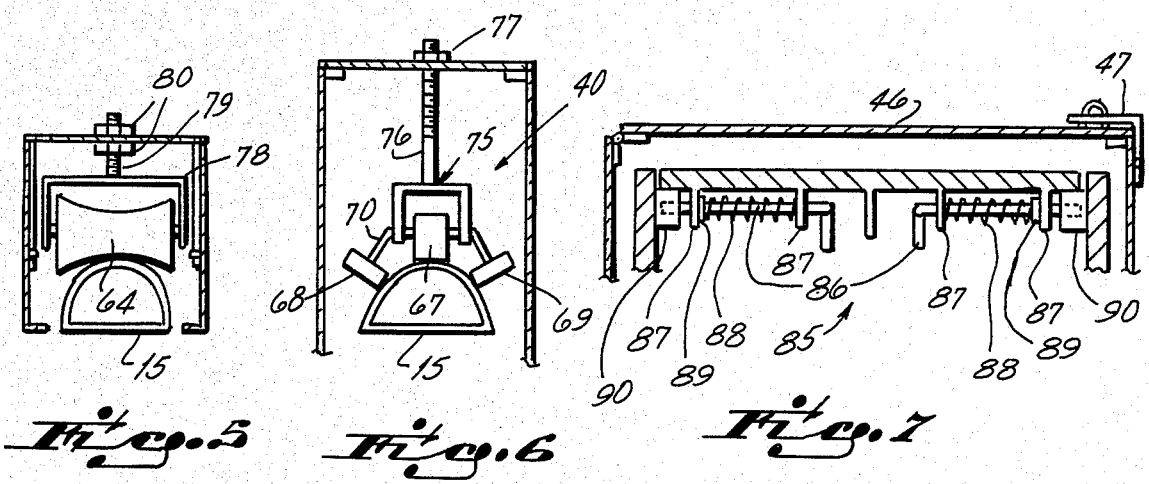
FIG. 5 is a sectional view taken along line 5—5 of FIG. 3.
FIG. 6 is a sectional view taken along line 6—6 of FIG. 3.
FIG. 7 is a sectional view taken along line 7—7 of FIG. 3, detailing the upper latching mechanism of the top panel.

The intermediate roller assemblies 38, 39 and 40 and second concave roller 64 are appropriately spaced along the arcuate top panel 37 so as to provide an inwardly directed force which is perpendicular to the apex of the tile 15 to promote passage of the fully erected tile through the tile layer 10 in a smooth curve with a minimum of bending pressure applied to the tile. As shown in FIG. 6, which is a cross sectional view showing representative roller assembly 40, each roller assembly comprises a central roller 67 which applies force along the apex of the tile 15, and two side engaging rollers 68 and 69 which apply force against the arcuate sides of the upper portion of the tile 15. The rollers 67, 68, 69 are rotatably mounted on a rod 70 which is appropriately bent at either end to form axles so that rollers 68 and 69 engage the sides of the tile 15. The rod 70 is fixed in a mount 75 which includes a threaded mounting rod 76 that is received in a threaded bore in the top panel 37. The rod 76 is secured by a lock nut 77. As shown in FIG. 5, second concave roller 64 is rotatably mounted in a frame 78 which includes a similar mounting rod and lock nut arrangement for attachment to the top panel 37, the rod and lock nut for the second concave roller frame 78 here denominated by 79 and 80, respectively.

To promote and maintain the complete opening of the tile 15, flat rollers 65 and 66 are mounted in the rearward section 24 in opposed spaced relation to the intermediate roller assemblies 38 and 39, respectively. Flat rollers 65 and 66 are rotatably and removably mounted in upwardly opening U-shaped guide and retaining members 71 and 72, respectively, which are formed in both sides of the rearward side shields 26. These flat rollers press against the flat bottom of the arched tile 15, complimenting the pressure applied by the roller assemblies 38 and 39 against the upper portion of the tile, and further serve to keep the tile properly aligned within the flow path by preventing axial rotation of the tile.

It will be understood that the number and type of guide rollers employed herein is not deemed critical to the practice of this invention; it is only important that the rollers in whatever combination or form serve to fully open or maintain open the arched tile before it is laid, and provide a relatively smooth arcuate path of travel for the tile as it passes through the layer mechanism so as to minimize the bending pressures applied to the tile.

A preferred form of releasable mount for the top panel 37 is particularly shown in FIGS. 2, 3 and 7. Two rigid metal straps 81 depend from the top panel 37 adjacent the discharge end 36 of the layer 10. The straps 81 have a rearwardly facing notch 82 formed thereon which cooperates with a projection 83 formed on the interior of each of the rearward side shields 26 adjacent the discharge end 36. These notches 82 cooperate with the projections 83 to keep the panel 37 from moving with respect to side shields 26.

At the opposite end of the top panel 37 is a releasable latch means 85. Latch means 85 is carried on the interior of the top panel 37, and comprises two outwardly facing L-shaped rods 86 which are journalled in guides 87 fixed to top panel 37. Springs 88 carried by the horizontal portion of the rods 86 bear against guides 87 and radially extending stops 89, which stops are located on the rods to thereby spring-load the rods in an outwardly direction. The outwardly facing ends of the horizontal portions or the rods are received in collars 90 formed on the inside of the upper portion of rearward side shields 26. Metal strap 91 carried by the top panel 37 serves to retain the vertical portions of the L-shaped rods 86 in place.

To install the top panel 37 between the rearward side shields 26, the notched straps 81 are first positioned on the projections 83. The top panel 37 is then lowered into position with the rods 86 squeezed inwardly and then released to seat within the collars 90. Optional stops or blocks 92 are provided adjacent the upper edges of the rearward side panels 26 for the top panel 37. Similar stops 93 are likewise provided for hinged door 46.

The top panel 37 extends a small distance into the forward section 23 of the tile layer 10, and is covered by hinged door 46. In this way, the latch assembly 85 is protected from any dirt and debris churned up during the tile laying operation. Access to the latch assembly 85 is gained by opening door 46. It will be seen that top panel 37 is spaced slightly inwardly of door 46, and does not contact or ride against the latter when the layer is in operation.

In light of the foregoing, it will be appreciated that loading and unloading of tile is readily and simply accomplished. With hinged door 46 opened and first concave roller 52 removed, latch assembly 85 is hand manipulated and the top panel lifted off the rearward section 24. Tile may be thereupon loaded, unloaded or adjusted through the unobstructed access thereby provided to the interior of the layer 10.

Tile Layer—Round Tile

Figures 8, 9:
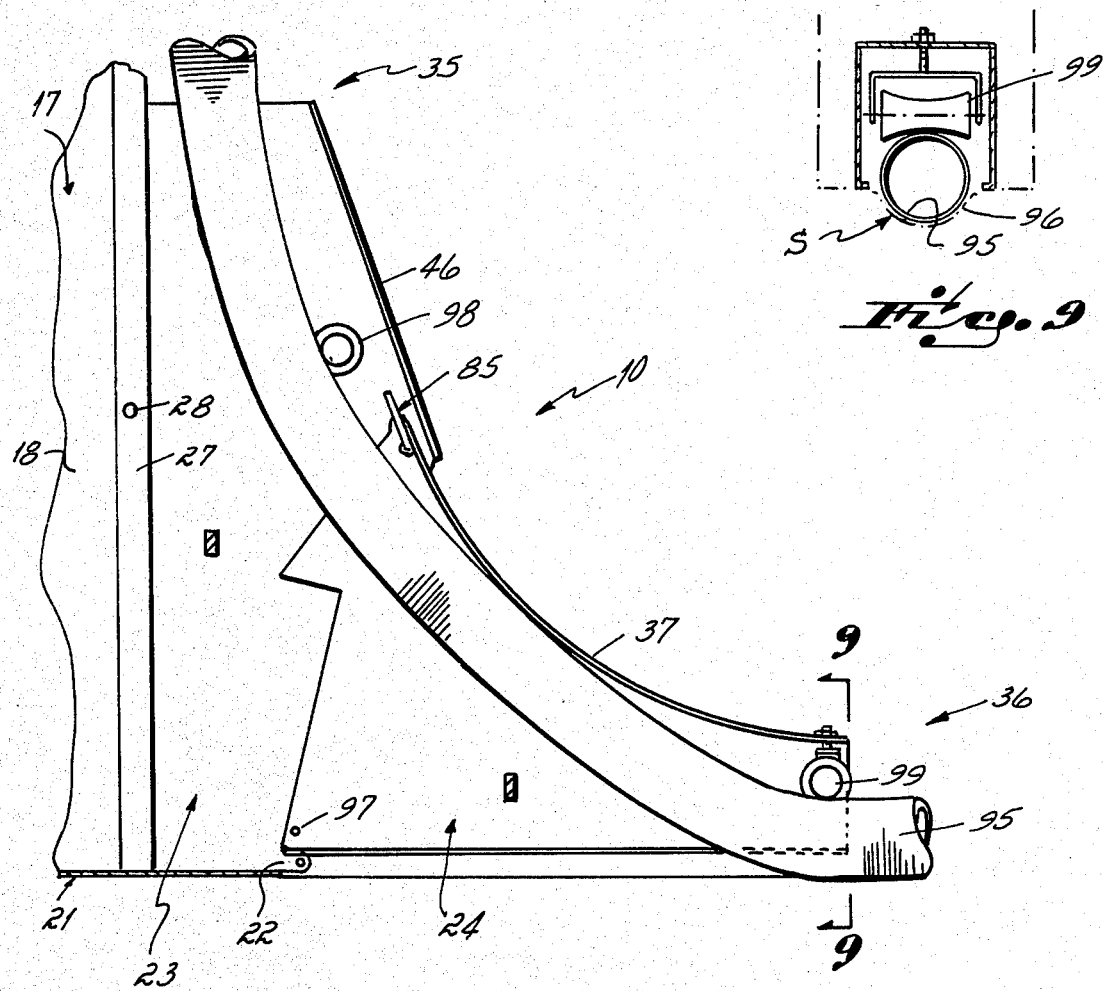
FIG. 8 is a cross sectional view, similar to that of FIG. 3, with the tile layer adapted for use with round tile.
FIG. 9 is a sectional view taken along line 9—9 of FIG. 8.

Referring now to FIGS. 8 and 9, the tile layer of this invention is shown as adapted for laying round or circular cross section corrugated tile 95, such as 4" or 6" round plastic tile. Except as hereinafter noted, this layer structure is identical to that as previously described.

Briefly, this modification or adjustment of the layer for round tile preferably comprises use of guide rollers only adjacent the entry area 35 and discharge end 36, and movement of the pivot point of the rearward section 24 upwardly, as will be more fully described immediately below.

As previously noted, round tile is laid in a semi-annular groove or socket 96 formed in the bottom of the trench, and not in a flat bottom trench as used with arch tile. To this end, a groover is fixed to the shoe 21 which provides the necessary socket, S, (FIG. 9) in the otherwise flat trench bottom. It has been found advantageous to attach the groover directly to the shoe 21 rather than to the flat bottomed channel iron employed to form the flat bottom trench for the arch-type tile 15. Attaching the socket groover to the flat bottomed channel iron causes excessive pull for the trencher due to the increased soil area which is plowed by the combined groovers rather than dug by the trenching wheel 11. As a consequence of using the socket groove without the flat bottomed channel iron, the rearward section 24 is raised and directly pivotally connected to the forward section 23 by pivot bolts 97, which extend through forward and rearward side shields 25 and 26 on both sides of the layer 10. Rearward section 24 thereby rides along the top edge of the trench, as shown in FIG. 9.

In the laying of round tile, which does not need to be opened like arched tile, it has been found that only two rollers are necessary to guide the round tile through the layer, i.e., a first concave roller 98 removably mounted in the upper entry portion of forward section 23 and a second concave roller 99 mounted within the rearward section 24 adjacent the discharge end 36. Adaptation of the tile layer 10 from arched tile to round tile of a similar diameter therefore simply requires the removal of all rollers, save the concave roller 52 and second concave roller 64. In an alternate arrangement, both concave rollers can be mounted on the top panel 37. Alternatively, only the spreader roller 53 need be removed for laying of an appropriate diameter round tile.

The tile layer, so adjusted, is used with round tile just as used with arch tile.

Due to the ready removability of the rollers employed in this tile layer and by virtue of the easy access to the interior of the tile layer gained by the openable top portion, the tile layer of this invention can be quickly adapted for laying tile of varying diameters or types by simply interchanging the type and/or diameter of roller employed, and a simple pivot adjustment.

Unobstructed access to the interior of the tile layer permits loading and unloading of the tile through the top side of the tile layer. Loading in this manner eliminates the often substantial loading pressures encountered through conventional axial-type loading, wherein the tile is fed through the upper entry end of a tile layer and forcefully threaded through the layer. More significantly, in the instant invention the tile is readily removable from the tile layer in a manner which places virtually no significant bending forces on the tile.

This ability to quickly unload tile from the layer is most advantageous when the trencher and layer have to be removed from the trench during the course of the tile laying operation, such as when an obstruction is encountered which must be removed before tile laying can continue. Once the obstruction has been removed and the trencher and layer repositioned, tile laying commences again upon the simple reloading of the tile.

While this invention has been described with respect to a certain preferred embodiment, it will be appreciated that many modifications and changes may be made by those skilled in the art without departing from the spirit of the invention. Accordingly, applicant intends to be bound only the claims appended hereto.

What is claimed is:

1. An apparatus for laying semi-flexible arched plastic drainage tile having a flexible flat bottom in a trench, comprising:

two spaced side shields, the side shields being rigidly interconnected by bracing means, the side shields defining a layer interior which is rearwardly and upwardly open, an upper tile entry end and a lower tile discharge end, a top panel means substantially enclosing the rearwardly and upwardly open interior of the layer when mounted on the side shields, plural guide rollers mounted within the interior of the layer for directing the tile in a smooth curved path between the side shields from the entry end to the discharge end for laying in the trench, a plurality of guide rollers being removably mounted on the side shields and a plurality of guide rollers being mounted on the top panel means, means for mounting the top panel on the side shields so it can be opened to provide access to the interior of the layer for loading and unloading of tile through the upwardly open interior, the arched tile being fed into the entry end in a collapsed form, the flat bottom of the arched tile lying within the apex of the curved upper portion of the tile, the guide means further including a spreader means for opening the collapsed arched tile, the spreader means comprising a concave roller, and a spreader roller, the spreader roller having a radially extending disc-shaped central portion and tapered ends, the spreader roller and the concave roller being in opposed spaced relation such that when arched tile is caused to pass therebetween, the concave roller applies a force on the tile substantially perpendicular to the apex of the curved portion of the tile and the arched tile is partially spread out in opposite directions across the spreader roller.

2. A tile layer for use with a trenching apparatus, wherein the layer is particularly adapted for laying arched tile characterized by a flat bottom and an arcuate upper portion, comprising:

spaced side shield means defining an upper tile receiving area, a lower tile discharge area, and having edges defining a rearward opening to said layer, panel means extending between said spaced side shield means and removably covering said opening for selective loading and unloading of tile into and from said layer, tile guide means for guiding tile in a path from the receiving area to the discharge area, including a first concave roller mounted adjacent the receiving area, a spreader roller mounted in opposed spaced relation to the first concave roller, the spreader roller having a disc-shaped central portion and axially tapering end portions for contacting and spreading the bottom of the arched tile, a plurality of intermediate guide roller means along said path, each of the intermediate roller means contacting the upper portion of the tile at three points, and a second concave roller mounted adjacent the discharge area, the rollers and guide roller means forcing the tile open and directing it in a smooth curve within the side shields, a first portion of the guiding means being mounted on the panel means and another portion on the side shield means.

3. The tile layer of claim 2 wherein the first concave roller and the spreader roller are removably carried by the side shields, and the intermediate roller means and second roller are carried by the panel means.

4. The tile layer of claim 2 wherein the panel means includes hook means at one end thereof cooperating with hook receiving means mounted adjacent the discharge area of the layer, and resilient latch means at the opposite end of the panel means cooperating with latch receiving means mounted on the layer to releasably fix the panel means in place.

* * * * *

UNITED STATES PATENT AND TRADEMARK OFFICE
CERTIFICATE OF CORRECTION

PATENT NO. : 4,537,531
DATED : August 27, 1985
INVENTOR(S) : David L. Diefenthaler It is certified that error appears in the above-identified patent and that said Letters Patent is hereby corrected as shown below:

Column 1, lines 23, "was" should be --use--

Column 5, line 7, "by" should be --be--

Column 5, line 59, "so" should be --to--

Column 6, line 49, after "together" delete "to"

Signed and Sealed this

Eighteenth Day of March 1986

[SEAL]

Attest:

DONALD J. QUIGG

Attesting Officer

Commissioner of Patents and Trademarks